June 24, 1958 E. A. LINKE 2,840,205
ELECTROMAGNETIC CLUTCH AND BRAKE
Filed Nov. 1, 1954 4 Sheets-Sheet 1

INVENTOR.
ERNEST A. LINKE.
BY
Clark & Ott
Attorneys.

INVENTOR.
ERNEST A. LINKE.
BY Clark & Ott
Attorneys

June 24, 1958  E. A. LINKE  2,840,205
ELECTROMAGNETIC CLUTCH AND BRAKE
Filed Nov. 1, 1954  4 Sheets-Sheet 3
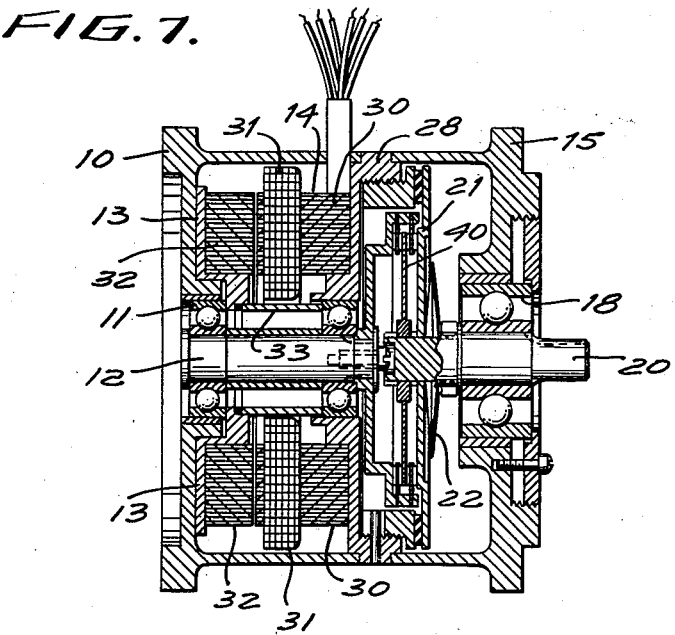
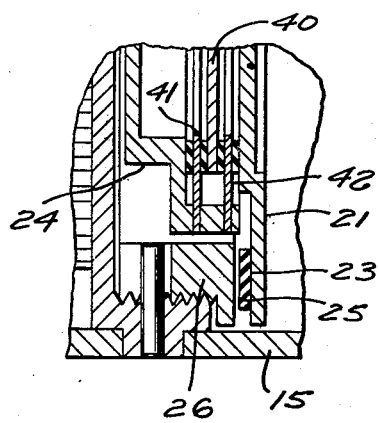
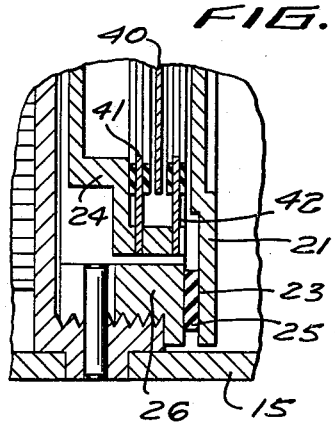
INVENTOR.
ERNEST A. LINKE.
BY
Clark & Ott
Attorneys.

June 24, 1958    E. A. LINKE    2,840,205
ELECTROMAGNETIC CLUTCH AND BRAKE
Filed Nov. 1, 1954    4 Sheets-Sheet 4
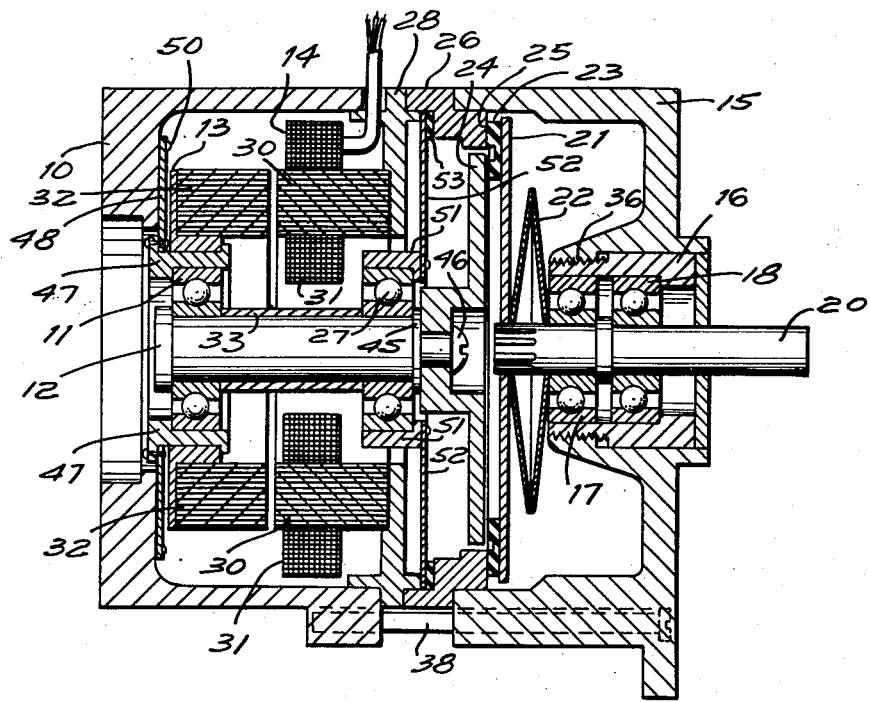
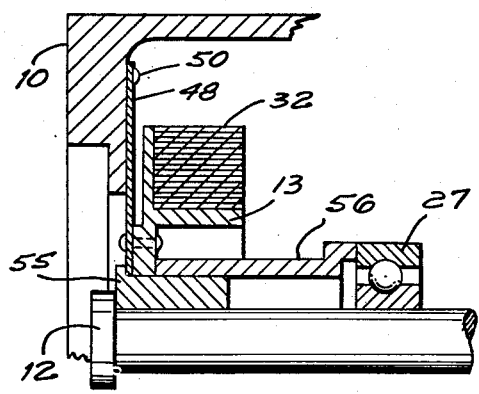
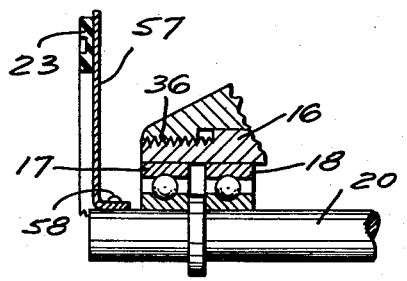
INVENTOR.
ERNEST A. LINKE
BY
Clark & Ott
Attorneys

United States Patent Office

2,840,205
Patented June 24, 1958

2,840,205

ELECTROMAGNETIC CLUTCH AND BRAKE

Ernest A. Linke, Washington Township, Bergen County, N. J., assignor to Air Associates, Inc., Teterboro, N. J., a corporation of New Jersey Application November 1, 1954, Serial No. 465,900

7 Claims. (Cl. 192—18)

This invention relates to a combination clutch and brake which is operated by alternating current power. It has particular reference to a fast acting mechanism which disconnects a driven shaft from a driver shaft and stops the driven shaft by fast braking action.

Prior art clutches and brakes have in general used direct current to excite the magnetic coils which cause the clutch action. In many cases the electromagnetic windings were attached to the rotating parts and added materially to the rotary inertia. The present invention includes a driven shaft with a disk brake and clutch which is light in weight and fast acting. No other clutch or brake mechanism is attached to the driven shaft so that its rotary inertia is quite low. The electromagnetic components, including the windings and the cores, do not rotate and have no adverse affect on the quick starting and stopping action of the driven shaft.

One of the objects of this invention is to provide an improved electromagnetic clutch and brake which avoids one or more of the disadvantages and limitations of prior art arrangements.

Another object of the invention is to simplify and improve the construction of a fast rotary brake.

Another object of the invention is to use alternating current power to operate the actuating means for the clutch and brake.

Another object of the invention is to increase the speed of braking a driven shaft by applying the braking action as soon as the driver and driven shaft are uncoupled.

Another object of the invention is to hold the driven shaft uncoupled from the driver and held against rotation when the electric power is not applied to the electromagnetic system.

Another object of the invention is to prevent excessive torque from being transmitted from the driver to the driven shaft.

The invention comprises a driver shaft mounted in a frame coupled to a clutch plate which rotates with the driver and is also capable of movement along its axis of rotation. An electromagnet, operated by alternating current, controls the axial movement of the clutch plate. A driven shaft is mounted in axial alignment with the driver shaft and is journaled for axial rotation and for a small movement along its axis of rotation. The driven shaft is provided with a clutch plate which is engaged by the driver clutch plate when the electromagnet moves the driver plate into axial engagement. An annular braking surface is provided on the frame which engages the driven clutch plate when the driver shaft is not in axial engagement. Suitable friction braking pads are secured to either one or all the surfaces which make contact during the driving and braking operations.

An alternate form of the invention comprises the above described driver shaft and its components acting against a driven shaft which includes a flexible clutch plate. The driven shaft is mounted in axial alignment with the driver shaft and is journaled for axial rotation but not for movement along the axis. The driven shaft is provided with a disk clutch plate having a peripheral area which can be bent from its normal position. The annular braking surfaces and friction pads are similar to the form described above.

For a better understanding of the present invention, together with other and further objects thereof, reference is made to the following description taken in connection with the accompanying drawings.

Fig. 7 is a cross-sectional view similar to Fig. 2 but showing an alternate arrangement comprising two driven clutch plates and corresponding frictional pads.

Fig. 8 is a detailed sectional view of the clutch-brake components shown in Fig. 7 when the driver shaft is coupled to the driven shaft.

Fig. 9 is a sectional view similar to Fig. 8 but showing the components when the driver and driven shafts are uncoupled and the driven shaft brake has been applied.

Fig. 10 is a cross-sectional view similar to Fig. 2 but showing an alternate form of construction of the driver shaft support.

Fig. 11 is a partial cross-sectional view showing still another form of driver shaft support.

Fig. 12 is a partial cross-sectional view showing the driven shaft and a portion of the flexible clutch plate.

Figure 1:
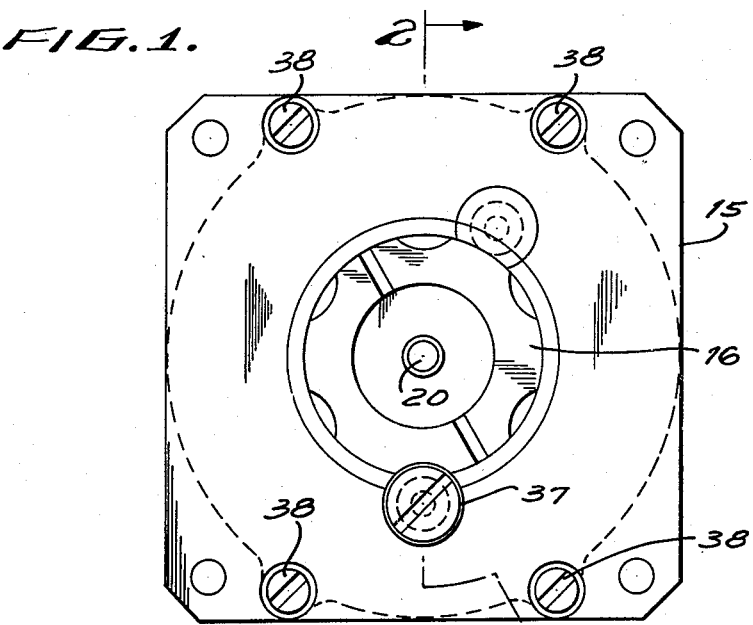
Fig. 1 is an end view of the clutch taken from the end which contains the driven shaft.

Referring now to Figs. 1 to 5 inclusive, the clutch and brake arrangement includes a frame portion 10 which supports one of the bearings 11 for a driver shaft 12 and an armature 13 for the electromagnet 14. Another frame portion 15 supports an adjustable bearing structure 16 which holds ball bearings 17 and 18. These bearings support a driven shaft 20 and a driven clutch plate 21 which is splined to the shaft 20 and is urged by a spring washer assembly 22 to move to the left. The plate 21 carries a double annular frictional pad 23 which may be engaged by a driver clutch plate 24, secured to driver shaft 12, or an annular stationary surface 25 which is part of a frame portion 26.

The clutch plate 24 is secured to the end of the driver shaft 12 by a screw which holds a portion of the plate against a shaft shoulder. The end of the shaft 12 is supported by a second ball bearing 27 which is arranged to be movable in an axial direction under control of the armature 13 when energized by the magnet 14. The magnet 14 is secured to another frame portion 28, the pole pieces each comprising a series of laminations 30 surrounded by a winding 31. The armature 13 includes a series of laminations 32 wound in annular fashion about the base and normally forming a short air gap between the ends of laminations 32 and 30. The central portion of the base 13 engages a sleeve 33 which is movable on the shaft 12 and engages ball bearing 37. The windings 31 are connected together as indicated in Fig. 6 and connected through a switch 34 to a source of two phase alternating current power 35.

Figure 2:
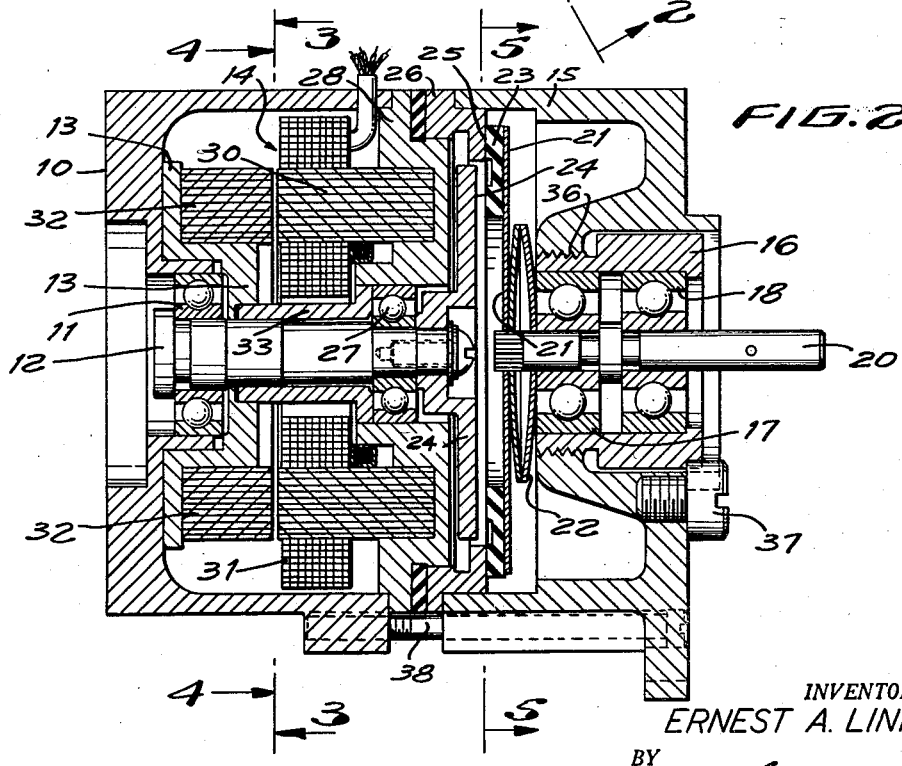
Fig. 2 is a cross-sectional view taken along line 2—2 of Fig. 1 showing all the major components.
Figure 3:
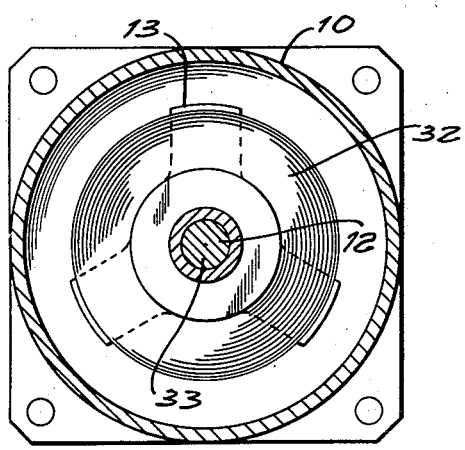
Fig. 3 is a cross-sectional view taken along line 3—3 of Fig. 2 showing the armature of the electromagnet.
Figure 4:
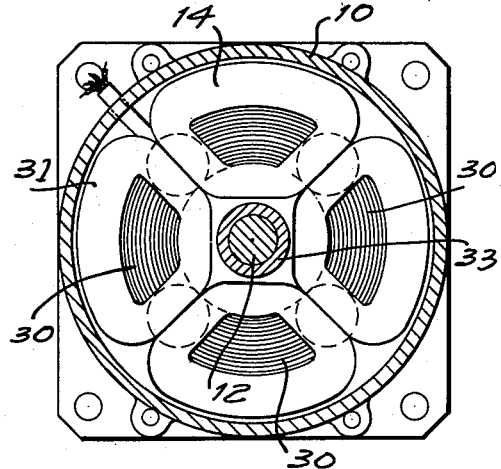
Fig. 4 is a cross-sectional view taken along line 4—4 of Fig. 2 showing the windings and pole pieces of the electromagnet.
Figure 5:
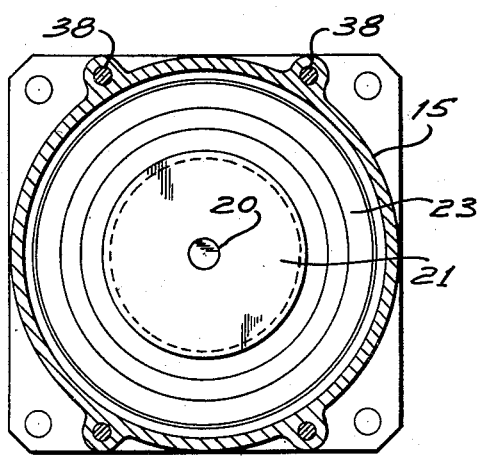
Fig. 5 is a cross-sectional view taken along line 5—5 of Fig. 2 showing the driven clutch plate.

When it is desired to drive the driven shaft 20 by the driver shaft 12, the switch 34 is closed and alternating current power is applied to the windings 31, drawing the armature structure to the right, as viewed in Fig. 2, and moving the clutch plate 24, together with the ball bearing 27, into engagement with the frictional pad 23 and removing it from the annular braking surface 25. Frictional contact between the clutch plate 24 and the pad 23 drives the plate 21 and the shaft 20 to transmit rotary power to the driven shaft. As the plate 21 is moved to the right, the spring 22 is compressed to furnish the contact force between the pad 23 and the clutch plate 24. This contact force may be adjusted to meet varied requirements of service and variable loads by positioning the bearing structure 16 by turning it in a screw thread 36. The bearing structure 16 may be secured by a screw head 37 after the proper adjustment is attained. When it is desired to uncouple the driver and driven shafts the switch 34 is opened and the force of the spring 22 pushes the clutch plate out of engagement with the pad 23 at the same time pressing the pad 23 into engagement with the stationary face 25 causing a powerful braking action to be exerted on the driven shaft to bring it to a stop quickly without exerting any force on the rotary energy of the driver shaft 12 which may continue to revolve or may be stopped by other means at a slower rate.

The above described clutch and brake include four frame portions 10, 15, 26 and 28 which can be bolted together by bolts 38 to form a unitary enclosing structure. Other frame structures may be employed without altering the purpose or scope of the operating components.

Figure 6:
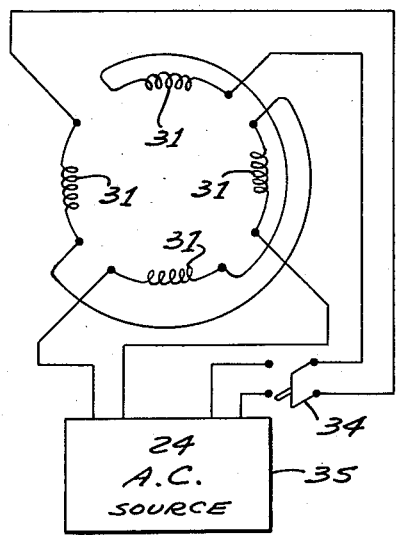
Fig. 6 is a schematic wiring diagram showing how the windings are connected.

The diagram of connections shown in Fig. 6 indicates the manner in which the four windings may be connected to a two phase alternating current power supply. When connection is made as indicated the magnetic force is evenly distributed around the periphery of the armature face and there is no tendency to tilt the armature out of axial alignment. If three phase power is used, six magnet windings can be employed, two for each phase, each pair disposed in diametrical position. If single phase power is the only power available a phase splitting supply may be used, including a capacitor or the combination of a capacitor and a transformer having a tapped secondary. Whatever system is used, an even axial force may be obtained by applying each phase to two diametrically opposed windings in series.

In Figs. 7, 8 and 9 an alternate structure is shown which is suitable for rotary systems of greater mechanical power. Two driven clutch plates 21 and 40 are employed, each secured to the driven shaft 20 by some suitable means such as splining. The structure of the electromagnet 14 and its armature 13 is the same as the device shown in Fig. 2 and the driver clutch plate 24 is engaged by the motion transmitted by the sleeve 33 from the armature 13 as described above. However, the clutch plate 24 is assembled with two spring rings 41 and 42, each supporting two frictional pads on either side near its inner edge. The rings 41 and 42 are secured to the plate 24 at their outside edges and when the driver shaft is coupled to the driven shaft by the actuation of the electromagnet, both surfaces of the plate 40 and one surface of the plate 21 are frictionally engaged by the pads as indicated in Fig. 8. The axial movement of plate 24, as described in connection with Fig. 2, disengages clutch plate 21 from its braking contact with the surface 25 and permits it to move with the driver clutch plate rings 41 and 42.

When the electromagnet is de-energized the driver clutch plate is forced to the left by the action of the spring 22, as described above, and the friction pad 23 engages the surface 25 and is braked to a stop. The movement of the plate 24 releases the frictional pads on the spring rings 41 and 42 and the plates 40 and 21 are uncoupled from the driver shaft, as indicated in Fig. 9.

Fig. 10 illustrates an alternate form of the invention in which the ball bearings 11 and 27 are securely fastened to shaft 12 by means of sleeve 33, washer 45, and clamping screw 46 which also secures clutch plate 24. Bearing 11 is held by an annular support 47 which in turn is held in central alignment by a flexible diaphragm 48. The diaphragm 48 is secured to the frame 10 by a plurality of screws or rivets 50 at the outer periphery of the diaphragm. The annular support 47 is secured to the diaphragm in like manner.

The bearing 27 is held by an annular support 51 which in turn is held by a second diaphragm 52, secured at its periphery by being clamped between a portion of the plate 28 and a fiber washer 53. Flexible diaphragms 48 and 52 are arranged so that they normally hold the shaft 12 and clutch plate 24 in the position shown in Fig. 10, a small air gap existing between the face of the driver clutch plate and the inner portion of the friction pads 23 on the plate 21.

When current is applied to the windings 31, the cores 30 are magnetized and the armatures 32 are moved to the right a short distance, flexing the diaphragms 48 and 52 and moving the driver clutch plate 24 to the right to make contact with the inner portion of the pad 23 and move the disk 21 to the right (as in Fig. 10) breaking contact 25 and turning the driven shaft 20. The clutch plate 21 moves to the right by flexing the diaphragm spring 22 as before, the bearings 17 and 18 remaining in their normal position. The structure described above eliminates the movement of bearing races on a shaft in an axial direction and requires less lubrication.

Fig. 11 illustrates still another alternate arrangement in which the first ball bearing 11 is eliminated and an ordinary sleeve type bearing 55 is employed in conjunction with a sleeve 56 secured to the outer surface of the bearing 55 and holding the outer race of ball bearing 27 at the required distance. The operation of this form is the same as described above.

Fig. 12 illustrates an alternate form of the driven clutch assembly. In this arrangement a flexible diaphragm 57 replaces clutch plate 21 and is secured to shaft 20 by rivets or pins 58. The double pad 23 is the same as described above and normally makes frictional braking contact with a portion 25 of the casing. When the clutch is operated by passing current through the windings 31, the driver clutch plate 24 makes contact with the inner part of the pad 23 flexing diaphragm 57 and removing the outer portion of the pad 23 from contact with the surface 25. This being the running position, rotary power is transferred from the plate 24 to the pad 23 and diaphragm 57 because of the friction contact between pad 23 and plate 24 resiliently held in engagement by the stressed diaphragm.

While there have been described and illustrated several arrangements of the invention, it will be obvious that various changes and modifications can be made therein without departing from the field of the invention which should be limited only by the scope of the appended claims.

What is claimed is:

1. An electromagnetic clutch and brake comprising, a rotatable driver shaft coupled to a driver clutch plate and adapted for continuous rotation, a driven shaft in alignment with said driver shaft and spline-coupled to a driven clutch plate, a stationary annular surface which is normally in frictional engagement with a portion of said driven clutch plate, friction means mounted between the driver clutch plate and the driven clutch plate for engagement by both of said clutch plates, resilient means which stresses the driven plate toward said stationary surface, and electromagnetic means coupled to the driver shaft which moves the driver plate into engagement with the driven clutch plate and simultaneously disengages the driven clutch plate from engagement with the stationary surface.

2. An electromagnetic clutch and brake comprising, a rotatable driver shaft coupled to a driver clutch plate which is movable in a direction parallel to the shaft axis, a rotatable driven shaft in alignment with said driver shaft and spline-coupled to a driven clutch plate, a stationary annular surface which is normally in frictional engagement with a portion of said driven clutch plate to hold it in a non-rotatable position, friction means mounted between the driver clutch plate and the driven clutch plate for engagement by both of said clutch plates, resilient means which stresses the driven plate toward said stationary surface, and electromagnet means coupled to the driver shaft which moves the driver plate into engagement with the driven clutch plate and simultaneously disengages the driven plate from engagement with the stationary surface.

3. An electromagnetic clutch and brake comprising; a rotatable driver shaft secured to a clutch plate and journalled in a frame, said shaft and plate movable in a direction parallel to the shaft axis; a plurality of electromagnets secured to the frame, each having an armature coupled to the clutch plate; a rotatable driven shaft in alignment with said driver shaft and spline-coupled to a driven clutch plate; a stationary annular surface which is normally in frictional engagement with a portion of said driven clutch plate to hold it in a non-rotatable position; friction means mounted between the driver clutch plate and the driven clutch plate for engagement by both of said clutch plates, and resilient means which stresses the driven plate toward said stationary surface; said electromagnets arranged to move the driver plate into engagement with the driven clutch plate and simultaneously disengage the driven plate from engagement with the stationary surface.

4. An electromagnetic clutch and brake as set forth in claim 3 wherein said plurality of electromagnets are arranged for connection to a source of polyphase alternating current power for actuating the magnets and causing the two clutch plates to be coupled to each other by an uninterrupted mechanical force.

5. An electromagnetic clutch and brake as set forth in claim 4 wherein the electromagnetic means includes a plurality of electromagnets, each of said polyphase sources connected to two magnets which are positioned diametrically opposite each other around the driver shaft.

6. An electromagnetic clutch and brake comprising, a rotatable driver shaft coupled to a driver clutch plate and adapted for continuous rotation, a driven shaft in alignment with said driver shaft and spline-coupled to a driven clutch plate, a stationary annular surface which is normally in frictional engagement with a portion of said driven clutch plate, friction means mounted between the driver clutch plate and the driven clutch plate for engagement by both of said plates, resilient means which stresses the driven plate toward said stationary surface, electromagnetic means coupled to the driver shaft which moves the driver plate into engagement with the driven clutch plate and simultaneously disengages the driven clutch plate from engagement with the stationary surface, and resilient means stressing the driver clutch plate toward its disengaged position.

7. An electromagnetic clutch and brake comprising, a rotatable driver shaft coupled to a driver clutch plate and adapted for continuous rotation, a driven shaft in alignment with said driver shaft and spline-coupled to a driven clutch plate mounted adjacent to said driver clutch plate, a stationary annular surface which is normally in frictional engagement with a portion of said driven clutch plate mounted on the same side of the driven clutch plate as the driver clutch plate, friction means mounted between the driver clutch plate and the driven clutch plate for engagement by both of said clutch plates, resilient means which stresses the driven plate toward said stationary surface, and electromagnetic means coupled to the driver shaft which moves the driver plate into engagement with the driven clutch plate and simultaneously disengages the driven clutch plate from engagement with the stationary surface.

References Cited in the file of this patent

UNITED STATES PATENTS

| | | |
|---|---|---|
| 2,401,003 | Lear | May 28, 1946 |
| 2,490,044 | Garbarini et al. | Dec. 6, 1949 |
| 2,954,775 | Herst et al. | Apr. 29, 1952 |
| 2,959,190 | Edwards | Apr. 29, 1952 |
| 2,618,368 | Hoover | Nov. 18, 1952 |
| 2,646,520 | Labastie | July 21, 1953 |
| 2,727,605 | Rabinow | Dec. 20, 1955 |

FOREIGN PATENTS

| | | |
|---|---|---|
| 642,749 | Great Britain | Sept. 13, 1950 |